(12) United States Patent
Botros (10) Patent No.: US 9,552,393 B2
(45) Date of Patent: Jan. 24, 2017

(54) ADAPTIVE RECORD LINKING IN A DISTRIBUTED COMPUTING SYSTEM

(75) Inventor: Sherif Botros, Palo Alto, CA (US)

(73) Assignee: Business Objects Software Ltd., Dublin (IE)

( * ) Notice: Subject to any disclaimer, the term of this patent is extended or adjusted under 35 U.S.C. 154(b) by 286 days.

(21) Appl. No.: 13/350,429

(22) Filed: Jan. 13, 2012

(65) Prior Publication Data

US 2013/0185306 A1 Jul. 18, 2013

(51) Int. Cl.
G06F 7/00 (2006.01)
G06F 17/30 (2006.01)

(52) U.S. Cl.
CPC .............. *G06F 17/30522* (2013.01)

(58) Field of Classification Search
CPC ................................ G06F 17/30522
USPC .......................................... 707/748
See application file for complete search history.

(56) References Cited

U.S. PATENT DOCUMENTS

| | | | | |
|---|---|---|---|---|
| 7,231,343 B1* | 6/2007 | Treadgold | ........... | G06F 17/2785 704/9 |
| 7,305,404 B2* | 12/2007 | Owens | .............. | G06F 17/30595 |
| 8,095,386 B2* | 1/2012 | Lassetter et al. | ................. | 705/3 |
| 2001/0044758 A1* | 11/2001 | Talib et al. | ...................... | 705/27 |
| 2002/0133365 A1* | 9/2002 | Grey et al. | .......................... | 705/1 |
| 2005/0182745 A1* | 8/2005 | Dhillon et al. | .................... | 707/1 |
| 2008/0133592 A1* | 6/2008 | Peters | ............... | G06F 17/30256 |
| 2009/0187553 A1* | 7/2009 | Sarkar et al. | ..................... | 707/5 |
| 2010/0312837 A1* | 12/2010 | Bodapati et al. | ............. | 709/206 |
| 2012/0158743 A1* | 6/2012 | Gardner | ............ | G06F 17/30038 707/748 |
| 2012/0166182 A1* | 6/2012 | Ko | ........................ | G06F 17/276 704/9 |
| 2012/0323839 A1* | 12/2012 | Kiciman | .............. | G06N 99/005 706/52 |

* cited by examiner

*Primary Examiner* — Tony Mahmoudi
*Assistant Examiner* — Michael Le
(74) *Attorney, Agent, or Firm* — Fish & Richardson P.C.

(57) ABSTRACT

Techniques for information retrieval include the features of receiving a plurality of data records, updating a plurality of database records associated with the received plurality of data records stored in a database, receiving a query for a particular database record, and preparing for display, in response to the query, one or more of the database records based on at least one of the name of the business enterprise or the alias associated with the name of the business enterprise. Each data record includes data fields associated with a business enterprise. The data fields include a name of the business enterprise. Each database record includes attributes including the name of the business enterprise and an alias associated with the name of the business enterprise. The query includes at least one of the name of the business enterprise or the alias associated with the name of the business enterprise.

20 Claims, 8 Drawing Sheets

Company Name
International Business Machines

| Address | Phone Number | Type |
|---|---|---|
| 1 New Orchard Road Armonk, New York 10504 | 914-499-1900 | Corporate Headquarters |

| Alias 1 | Alias 3 |
|---|---|
| IBM | BMI |
| Alias 2 | |
| Eye Bee Em | |

405

Company Name
International Business Machines

| Address 1 | Phone Number | Type |
|---|---|---|
| 1 New Orchard Road Armonk, New York 10504 | 914-499-1900 | Corporate Headquarters |
| Address 2 | Phone Number | Type |
| 4660 La Jolla Village Dr. San Diego, CA 92122 | | Local Office |

| Alias 1 | Alias 3 |
|---|---|
| IBM | BIM |
| Alias 2 | Alias 4 |
| Eye Bee Em | Int'l Bus. Machs. |

Vendor Matching

Possible Matches
Match Score Pattern Filter — 810

| Select | Criteria | Min Score | Max Score |
|---|---|---|---|
| ☒ | Name | 75% | 100% |
| ☒ | Address | 75% | 100% |
| ☐ | City | 75% | 100% |
| ☐ | State | 75% | 100% |
| ☐ | Country | 75% | 100% |
| | Overall Match Score | 75% | 100% |

Filter Summary Results

Number of records: 3
Remaining number of records: 1706

[Retrieve Records]

Match Score Pattern – Review and resolution — 815

| Select | Overall Match Score | Name | | Address | |
|---|---|---|---|---|---|
| | | Customer Record | Reference Record | Customer Record | Reference Record |
| ☐ | 66.72% | MUSSETT ENGINEERING LTD. | MUSSETT LTD | LODDON INDUSTRIAL ESTATE | Loddon Industrial Estate NORWICH |
| ☐ | 66.18% | SUMITOMO LIGHT MET. | SUMITOMO LIGHT METAL INDUSTRIES, LT | 3-1-12 CHITOSE MINATOKU | 3-1-12, CHITOSE, MINATO-KU NAGOYA |
| ☐ | 62.67% | VALTEC AIRCRAFT SUPPLY | Kirkhill Aircraft Parts Co. | 1 ESSEX INDUSTRIAL PARK | 1 Essex Industrial Park Essex |

[Accept] [Reject]

FIGURE 8

ADAPTIVE RECORD LINKING IN A DISTRIBUTED COMPUTING SYSTEM

TECHNICAL BACKGROUND

This disclosure relates to adaptive record linking and, more particularly, record linking using information retrieval and an adaptive learning machine.

BACKGROUND

Users of client computers send data records to a records management system. The data records include information about an entity. An entity includes, for example, a person, a business, or an agency. Information about an entity includes, for example, a name, address, or telephone number. The data records may be incomplete. For example, a data record includes a name associated with an entity but does not include an address. The data records may include errors in the information, such as misspelled words or obsolete information. For example, a zip code in an address field of a data record may be transposed, or an address in the address field of a data record reflects an entity's previous address. The data records may include non-standard information associated with an entity. For example, an entity's name is abbreviated in a name field of a data record. Additionally, users of client computers may send data records with different information associated with the same entity. For example, one data record includes an address for a business's headquarters while another data record for the same business includes a regional address. Moreover, the criteria for matching a data record may be fuzzy, and may involve the relative ranking of candidate records. Matching a data record with an entity can thus be difficult.

SUMMARY

This disclosure describes general embodiments of systems, methods, apparatus, and computer-readable media for information retrieval using an adaptive learning machine including the features of receiving, at a local computing system, a plurality of data records from one or more remote computing systems, each data record including one or more data fields associated with a business enterprise, the one or more data fields including a name of the business enterprise; updating a plurality of database records associated with the received plurality of data records stored in a database communicably coupled to the local computing system, each database record including attributes including the name of the business enterprise and an alias associated with the name of the business enterprise; receiving, at the local computing system, a query for a particular database record of the plurality of database records, the query including at least one of the name of the business enterprise or the alias associated with the name of the business enterprise; and preparing for display at the remote computing system, in response to the query, one or more of the plurality of database records based on at least one of the name of the business enterprise or the alias associated with the name of the business enterprise.

In a first aspect combinable with any of the general embodiments, the alias includes at least one of a phonetic spelling of the name of the business enterprise, one or more initials of the name of the business enterprise, or an anagram of the name of the business enterprise.

In a second aspect combinable with any of the previous aspects, the attributes comprise a plurality of aliases.

In a third aspect combinable with any of the previous aspects, the plurality of aliases comprise a first alias associated with the phonetic spelling of the name of the business enterprise.

In a fourth aspect combinable with any of the previous aspects, the plurality of aliases comprise a second alias associated with the initials of the name of the business enterprise.

In a fifth aspect combinable with any of the previous aspects, the plurality of aliases comprise and a third alias associated with the anagram of the name of the business enterprise.

In a sixth aspect combinable with any of the previous aspects, updating a plurality of database records associated with the received plurality of data records includes searching the database for a database record of the plurality of database records that includes attributes that match at least one of the name of the business enterprise or the alias associated with the name of the business enterprise.

In a seventh aspect combinable with any of the previous aspects, updating a plurality of database records associated with the received plurality of data records further includes, based on one of the plurality of database records including attributes that match at least one of the name of the business enterprise or the alias associated with the name of the business enterprise, creating a new database record including attributes including the name of the business enterprise and at least one alias associated with the name of the business enterprise.

In an eighth aspect combinable with any of the previous aspects, the query includes at least one of a name of a particular business enterprise or an alias associated with the name of the particular business enterprise.

A ninth aspect combinable with any of the previous aspects further includes comparing at least one of the name of the particular business enterprise or the alias associated with the name of the particular business enterprise with the attributes of the plurality of database records.

A tenth aspect combinable with any of the previous aspects further includes matching the query with at least one of the plurality of database records based on the comparison.

An eleventh aspect combinable with any of the previous aspects further includes preparing the at least one matched database record for display at the remote computing system.

In a twelfth aspect combinable with any of the previous aspects, matching the query with at least one of the plurality of database records based on the comparison includes matching at least one of (i) the name of the particular business enterprise with the attribute including the name of the business enterprise of the database record, or (ii) the alias associated with the name of the particular business enterprise with the attribute including the alias associated with the name of the business enterprise of the database record.

In a thirteenth aspect combinable with any of the previous aspects, matching the query with at least one of the plurality of database records based on the comparison further includes matching geolocation data in the query with an attribute including geolocation data of the business enterprise.

In a fourteenth aspect combinable with any of the previous aspects, the at least one matched database record includes a plurality of matched database records.

A fifteenth aspect combinable with any of the previous aspects further includes ranking the plurality of matched database records.

A sixteenth aspect combinable with any of the previous aspects further includes transmitting at least a portion of the ranked database records to the remote computing system for display.

A seventeenth aspect combinable with any of the previous aspects further includes receiving a selection at the local computing system of one of the ranked database records.

An eighteenth aspect combinable with any of the previous aspects further includes determining whether the selected database record is the highest ranked database record.

A nineteenth aspect combinable with any of the previous aspects further includes, based on the selected database record being lower than the highest ranked database record, increasing a rank of the selected database record.

In a twentieth aspect combinable with any of the previous aspects, the local computing system includes an adaptive learning machine.

In a twenty-first aspect combinable with any of the previous aspects, updating a plurality of database records associated with the received plurality of data records stored in a database communicably coupled to the local computing system includes updating, with the adaptive learning machine, a plurality of database records associated with the received plurality of data records stored in a database communicably coupled to the local computing system.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Particular embodiments of the subject matter described in this disclosure can be implemented so as to realize none, one, or more of the following advantages. An adaptive learning machine for record linking may select the most relevant candidate database records that match a query taking into account abbreviated or misspelled strings, phonetically similar entities, and geographically close or co-located entities. The use of information retrieval heuristics to efficiently select good records together with the adaptive machine learning matching and ranking approach may improve precision and relevance in returning candidate database records in response to a query. Additionally, the relevance of the candidate database records may be adaptive to user's choices. Record linking using information retrieval heuristics and an adaptive learning machine may result in higher recall, better precision, and improved speed in returning candidate database records in response to a query. Another advantage of using an adaptive learning machine is that it may eliminate the need for the user to develop and maintain matching rules which may be costly.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

An adaptive learning machine receives data records from remote clients and updates the database records that are stored in a database and that are associated with the received data records. Each data record includes data fields associated with a business enterprise where one or more of the data fields include a name of the business enterprise. Each database record includes attributes that may include the name of the business enterprise, an alias associated with the name of the business enterprise, the physical location of the business, the business mailing address, phone number, or a web page uniform resource locator (URL). When the adaptive learning machine receives a query for a particular database record stored in the database, the adaptive learning machine prepares database records to be displayed by a client based on the similarity of the business attributes such as the business name or alias and its location to the stored database records.

Figure 1:
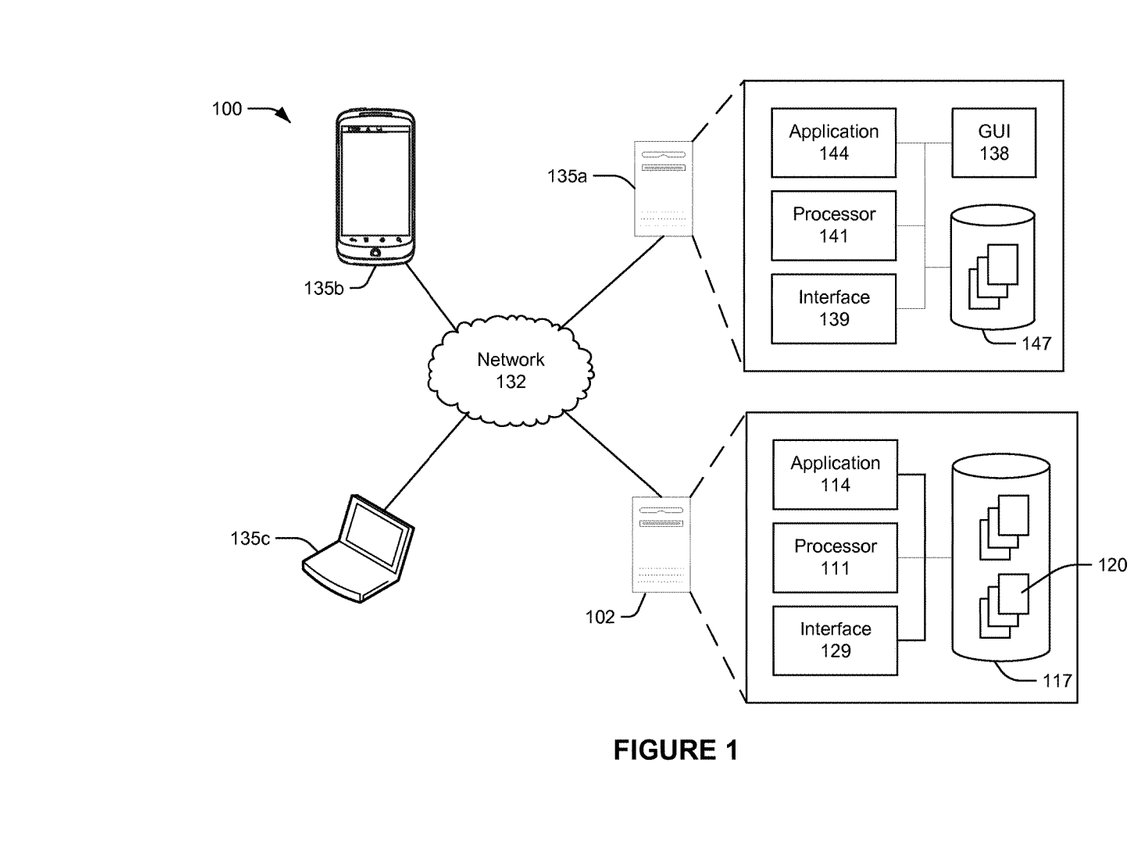
FIG. 1 illustrates an example distributed computing system operable to retrieve information using an adaptive learning machine.

FIG. 1 illustrates an example distributed computing system 100 operable to retrieve information using an adaptive learning machine 102. In some embodiments, the adaptive learning machine 102 includes a support vector machine (SVM) that analyzes data and recognizes patterns, and may be used for classification and regression analysis. For example, the adaptive learning machine 102 may receive inputs and predict, for each given input, which of two possible classes includes the input. In other words, the adaptive learning machine 102 as an SVM may be a classifier that provides a binary output (e.g., tool passage or no tool passage). Typically, a support vector machine constructs a hyperplane or set of hyperplanes in a high- or infinite-dimensional space, which can be used for classification, regression, or other tasks. An adaptive learning machine such as SVM can also be configured to rank database candidate records based on the history of user choice.

Turning to the example implementation of FIG. 1, the illustrated environment 100 includes or is communicably coupled with the adaptive learning machine 102 and one or more clients 135, at least some of which communicate across network 132. In general, environment 100 depicts an example configuration of a system capable of providing stateful execution of stateless applications in a substantially transparent way, as well as dynamically determining the particular application's mode of operation in response to requests from its clients 135.

In general, the adaptive learning machine 102 may be any server that stores one or more hosted applications 114, where at least a portion of the hosted applications 114 are executed via requests and responses sent to users or clients within and communicably coupled to the illustrated environment 100 of FIG. 1. An example of a hosted application 114 is an information retrieval application based on adaptive learning. The information retrieval application is executed by the adaptive learning machine 102 to receive data records from remote clients 135, update database records that are stored in a database, and prepare database records for display at a client 135 in response to a query.

In some instances, the server 102 may store a plurality of various hosted applications 114, while in other instances, the server 102 may be a dedicated server meant to store and execute only a single hosted application 114. In some instances, the server 102 may comprise a web server, where the hosted applications 114 represent one or more web-based applications accessed and executed via network 132 by the clients 135 of the system to perform the programmed tasks or operations of the hosted application 114. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144.

In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may comprise software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102.

Further, all or a portion of the network 132 can comprise either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. In some embodiments, portions of the composite application may be implemented through a single enterprise-class solution for data integration, data quality, data profiling, and text analysis. For example, in some embodiments, the enterprise-class solution implemented may address cleansing and standardization of records, such as, for example, database records 120.

Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

The server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store database records 120 that contain information associated with an entity. Additionally, memory 117 may include any other appropriate data, such as VPN applications, firmware logs and policies, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135*a* (e.g., an enterprise client system), each client 135 includes a processor 141, an interface 139, a graphical user interface (GUI) 138, a client application 144, and a memory 147. In general, each client 135 includes an electronic computer device operable to receive, transmit, process, and store any appropriate data associated with the environment 100 of FIG. 1. It will be understood that there may be any number of clients 135 associated with, or external to, environment 100. For example, while illustrated environment 100 includes three clients (135*a*, 135*b*, and 135*c*), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure.

Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 that includes a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user. In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

A record linking service can retrieve records from a database by partitioning the database into groups that are likely to contain candidate database records that match a query and then determining the best matching candidate by computing similarity measures between each database record in a partition and the query. A record linking service that uses such techniques can be inefficient in terms of recall, speed, and precision.

For example, the record linking service uses rules to partition the database. The rules may eliminate good candidate matches if the database records include misspelled or wrong information, which causes a loss of recall. For instance, an information retrieval service may partition a database based on the first letter of the entity name in each database record. When a user submits a query for "Sisco," the information retrieval service would not match the query with database records for "Cisco" because the first letter of the entity name in the database record is different than the first letter in the query.

Furthermore, the partitions generated by the record linking service can be large. For large partitions, the record linking service would take a large amount of time to scan every database record in the partition for a match to the query. To determine the best matching candidate database record, the record linking service may use heuristic rules that may be rigid and not adaptable to a user. Using information retrieval heuristics and an adaptive learning machine to link records can improve recall, speed, and precision when matching candidate database records to a query.

Figure 2:
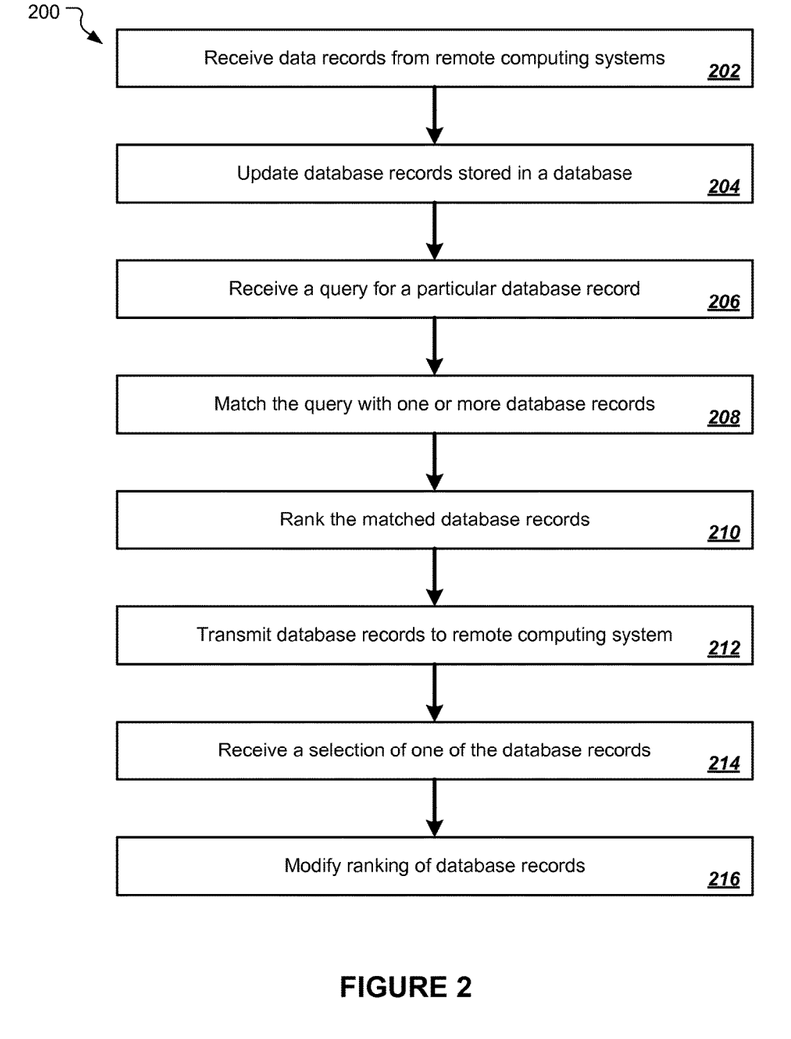
FIG. 2 illustrates an example flowchart for retrieving information using an adaptive learning machine.

FIG. 2 illustrates an example flowchart 200 for record linking using an adaptive learning machine. The adaptive learning machine can be a system of one or more computers that perform the process 200. For purposes of illustration, the process 200 will be described with respect to a computing system that includes an adaptive learning machine, e.g., the adaptive learning machine 102 of FIG. 1, that performs the process 200 and a remote client, e.g., clients 135 of FIG. 1.

Figure 3:
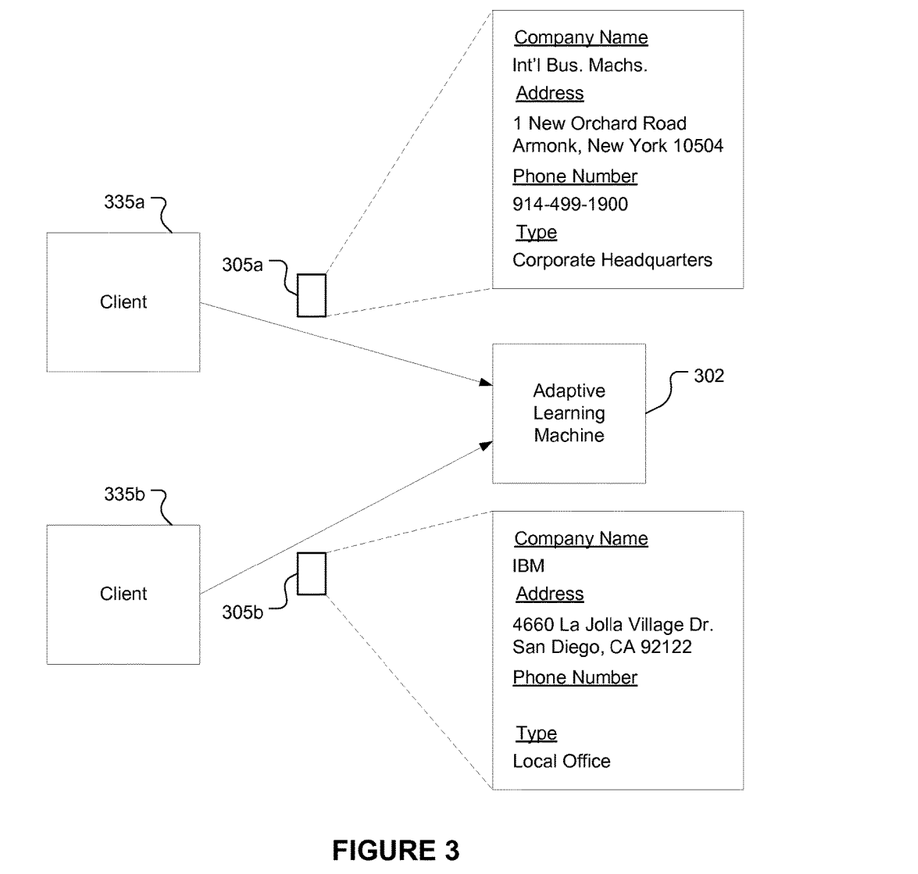
FIG. 3 illustrates examples of data records transmitted from a client to an adaptive learning machine.

In FIG. 2, the adaptive learning machine receives data records from one or more clients at step 202. FIG. 3 shows examples of data records 305a, 305b that an adaptive learning machine 302 receives from clients 335a, 335b. Each illustrated data record may include data fields associated with an entity, e.g., a business enterprise. The data fields include a name of the business enterprise. Additionally, the data fields can include an address of the business enterprise or a phone number of the business enterprise. Generally, the data fields can include any information associated with an entity. In FIG. 3, the data records 305a, 305b from clients 335a, 335b are associated with the same business enterprise, e.g., International Business Machines, but the information in some of the data fields are different.

Figure 4:
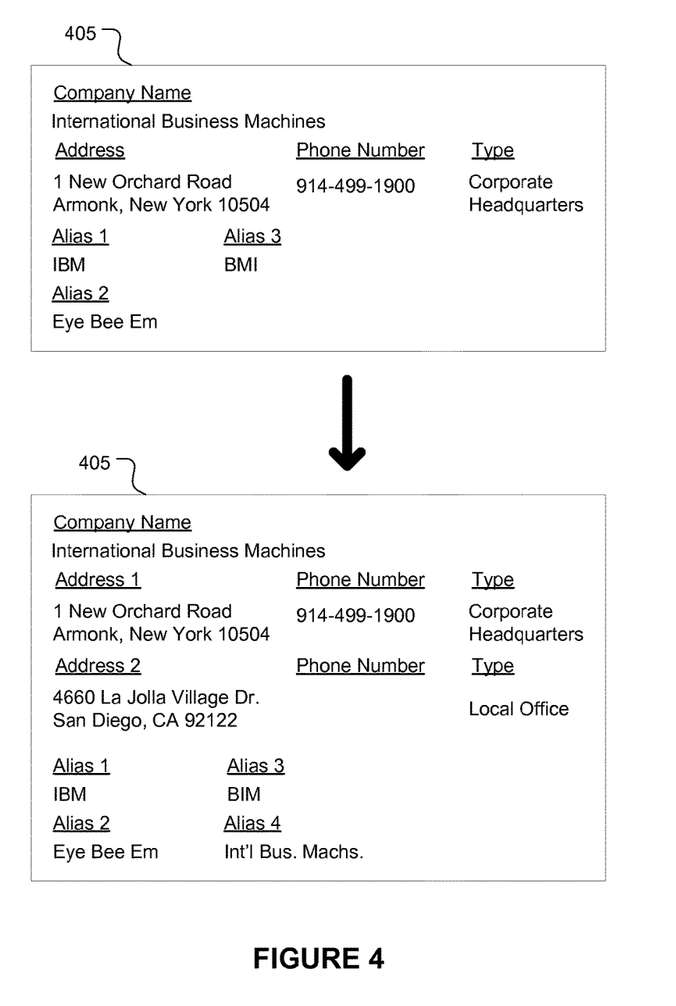
FIG. 4 illustrates an example database record that is updated with information from a data record.

Referring again to FIG. 2, when the adaptive learning machine receives the data records from the clients, the adaptive learning machine updates one or more database records that are stored in a database and that are associated with the data records that are received from the clients at step 204. FIG. 4 shows an example of a database record 405 that is updated by the adaptive learning machine to include the information from the data records received from the clients. Each of the database records includes attributes. The attributes include the name of the business enterprise and an alias associated with the name of the business enterprise. As shown in FIG. 4, an alias includes, for example, a phonetic spelling of the name of the business, the initials of the name of the business, an abbreviation of the name of the business, or an anagram of the name of the business. Additionally, the attributes can include an address of the business or a phone number of a business. Generally, the attributes can include any information associated with an entity. Certain attributes are indexed to improve the speed of information retrieval from the database. For example, the adaptive learning machine may index the name of the business enterprise, each alias associated with the name of the business enterprise, phonetic coding of the business name, and the geographic location of the business enterprise for each database record.

To update the database records that are stored in the database, the adaptive learning machine searches the database for a database record that includes an attribute that matches the information in the data fields of a data record that is received from a client. For example, the adaptive learning machine searches the database for a database record that matches the name of the business or the alias associated with the name of the business indicated by the data record using the indexed information for the database records. Alternatively or additionally, the adaptive learning machine can search for a database record that matches an address or a phone number associated with the business indicated by the data record. The adaptive learning machine can use various techniques to find a database record that includes an attribute that matches the information in the data record. For example, the adaptive learning machine can use fuzzy matching to account for misspelled words in the data record or the database record. In fuzzy matching, the adaptive learning machine will search for database records that include attributes that approximately match the information in the data record.

When the adaptive learning machine finds a database record that includes an attribute that matches information in a received data record, for example, the name of the business or the alias associated with the name of the business, the adaptive learning machine may insert information from the received data record that is missing from the stored database record into the stored database record. Additionally or alternatively, the adaptive learning machine creates a new database record including attributes that include the name of the business and an alias associated with the name of the business. The adaptive learning machine may index the attributes of the updated or newly created database record.

In FIG. 2, the adaptive learning machine receives a query from a client for a particular database record that is stored in the database at step 206. The query includes a name of a business, an alias associated with the name of the business, or both the name and the alias. Alternatively or additionally, the query can include other information associated with the business, such as an address or phone number of the business.

At step 208, database records are selected to match the query. The adaptive learning machine searches for a match by, for example, comparing the terms in the query with the indexed attributes of database records in the database. The adaptive learning machine can perform this comparison using appropriate matching techniques, such as fuzzy matching. Based on this comparison, the adaptive learning machine determines whether a database record matches the query. For example, the adaptive learning machine determines that a database record matches a query when the term in the query matches the indexed attribute that includes the name of the business in the database record. As another example, the adaptive learning machine determines that a database record matches a query the term in the query matches the indexed attribute that includes the alias associated with the name of the business in the database record. For instance, the adaptive learning machine will determine that a database record for "Johnson and Johnson" matches a query for "J&J" based on the indexed attribute that includes the alias "J&J" associated with the name "Johnson and Johnson" in the database record. In yet another example, the adaptive learning machine determines that a database record matches a query when geolocation data in the query matches an indexed attribute that includes geolocation data of the business in the database record.

The matched database records are selected, for example, using term frequency—inverse document frequency ("TFIDF") weighting. The TFIDF scheme may be used to score and rank the relevance of a database record given the query. In TFIDF, a database record that includes unique terms that matches the unique terms in the query will be given more weight than a database record that includes common terms that matches the common terms in the query. For example, a database record that includes an attribute that specifies "Sherif" will be given more weight than a database record that includes an attribute that specifies "S International" or "S Company" given a query for "Sherif International Company," because the word "Sherif" is more unique than the words "International" or "Company." In TFIDF, weighting is attached to a term. In some embodiments TFIDF is proportional to the product of term frequency and inverse document frequency. In some embodiments, term frequency is a measure proportional to a count of the number of occurrences of a term in a document. In some embodiments, the term frequency is inversely proportional to document length to effect a normalization with respect to document length. In some embodiments, the inverse document frequency is proportional to number of documents in a corpus. In some embodiments, the inverse document frequency is inversely proportional to number of documents in the corpus containing the term.

As an alternative or in addition to TFIDF weighting, other techniques (e.g., other information retrieval heuristics) may be used to match database records, such as string edit distances, term set intersection metrics, and geographic location comparison metrics. For example, other attributes of the database record that were not compared with the query, such as industry codes, whether the company is a parent company or a subsidiary, and other company information, may be used to determine the relevance of the database record.

The adaptive learning machine then ranks the matched database records in step 210. For example, the adaptive learning machine may rank the matched database records according to a history of user choices in similar contexts. For example, in some embodiments, a user (i.e., a client) may provide feedback to the adaptive learning machine by selecting a particular matched database record (e.g., as described in step 214) in a similar context.

Figure 5:
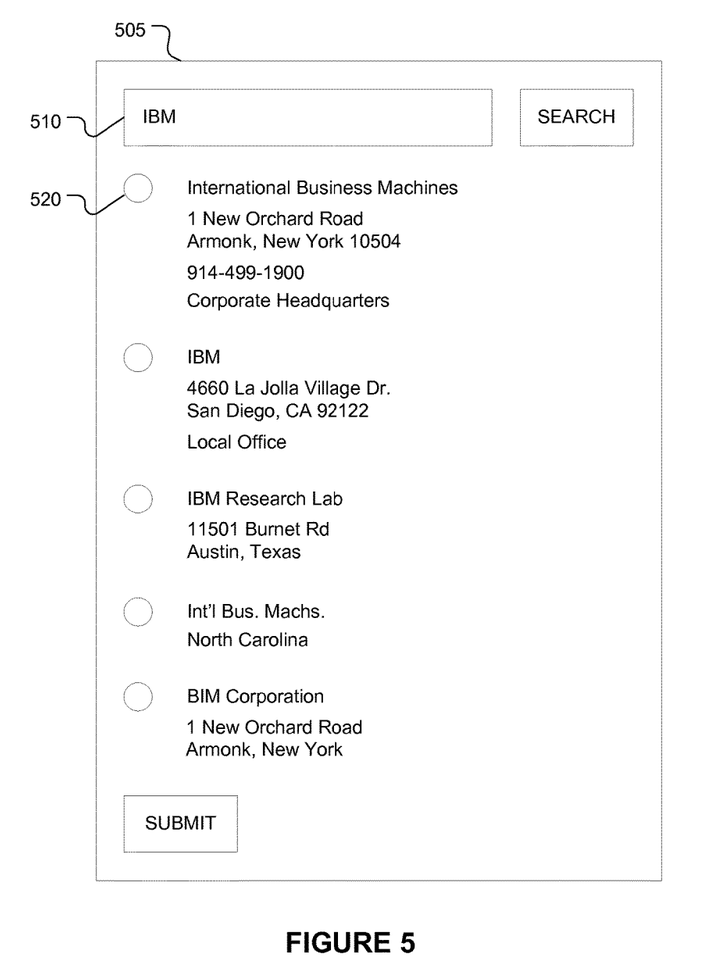
FIG. 5 illustrates an example interface of a client that displays database records relevant to a query.

The adaptive learning machine then transmits the highest ranked database records to the client for display to a user in step 212. For example, the adaptive learning machine determines that thirty database records are relevant to a query. The adaptive learning machine may transmit the top five of the thirty database records to the client for display to a user. FIG. 5 shows an example interface 505 of a client that displays the highest ranked database records for a query. In FIG. 5, a user of the client has entered a query for "IBM" in the query box 510. After processing the query as described above, the adaptive learning machine transmits the top five database records of the relevant database records to the client. The client displays the database records received from the adaptive learning machine along with buttons 520 that the user can select to indicate that a database record is the correct database record. Once the user selects the correct database record, the client transmits the selection to the adaptive learning machine.

Referring again to FIG. 2, the adaptive learning machine receives a selection from the client of one of the presented database records in step 214. The adaptive learning machine uses the selection to determine the relevance and rank of the presented database records given the query. For example, the adaptive learning machine determines whether the selected database record is the highest ranked database record for the query. If the selected database record is not the highest ranked database record, the adaptive learning machine increases the rank of the selected database record. When the user resubmits the query at a later time, the adaptive learning machine will rank the database records based on the user's previous selection.

Clients provide data records that are matched against database records that are stored in a database. The matching process uses automated statistical classification techniques. Statistical output from the matching process is reviewed by trained resolution experts, and their feedback is used to retrain the statistical classification model. Resolution experts review the results of the statistical classification to confirm the output or provide corrections. Retraining the statistical classification model using feedback from trained resolution experts is referred to as adaptive learning.

Figure 6:
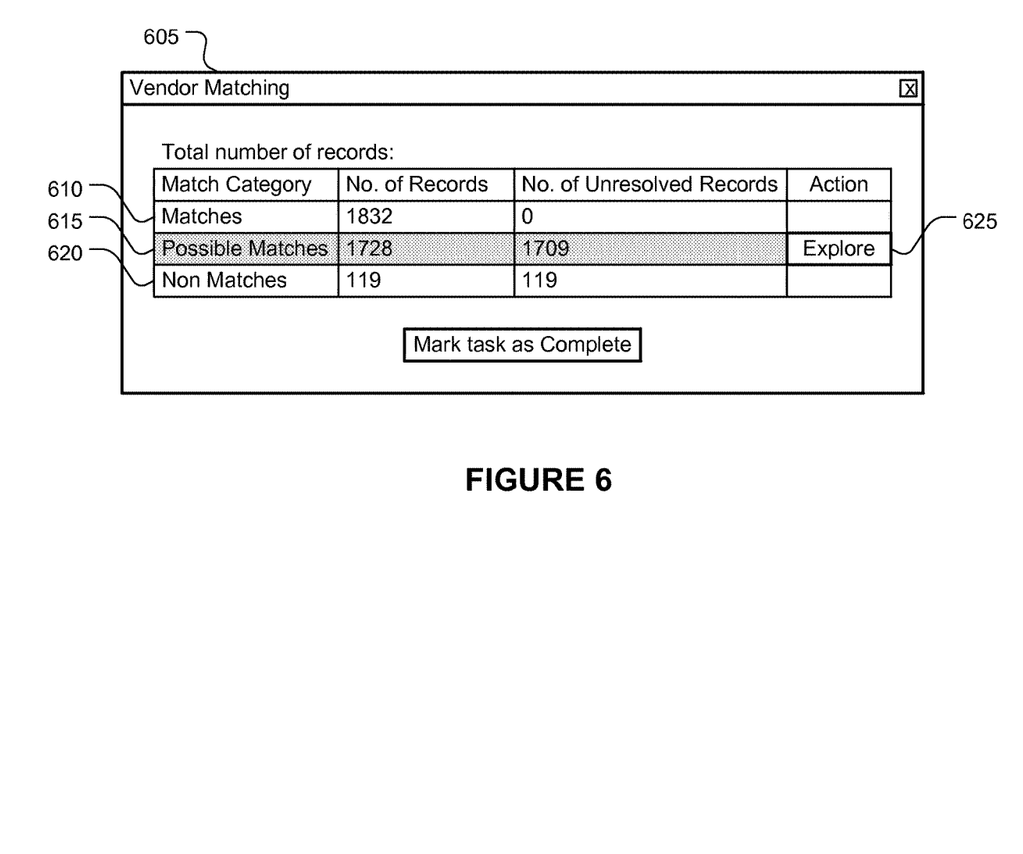
FIGS. 6-8 illustrate example interfaces of an adaptive learning machine that displays records for review by resolution experts.
Figure 7:
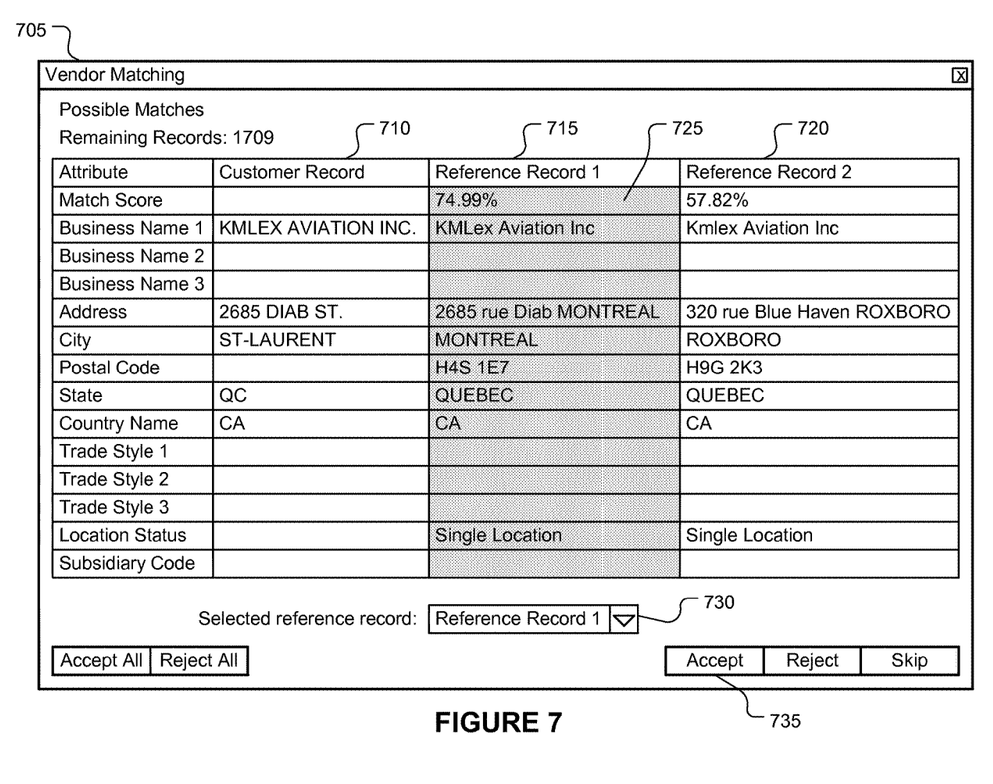
Figure 8:
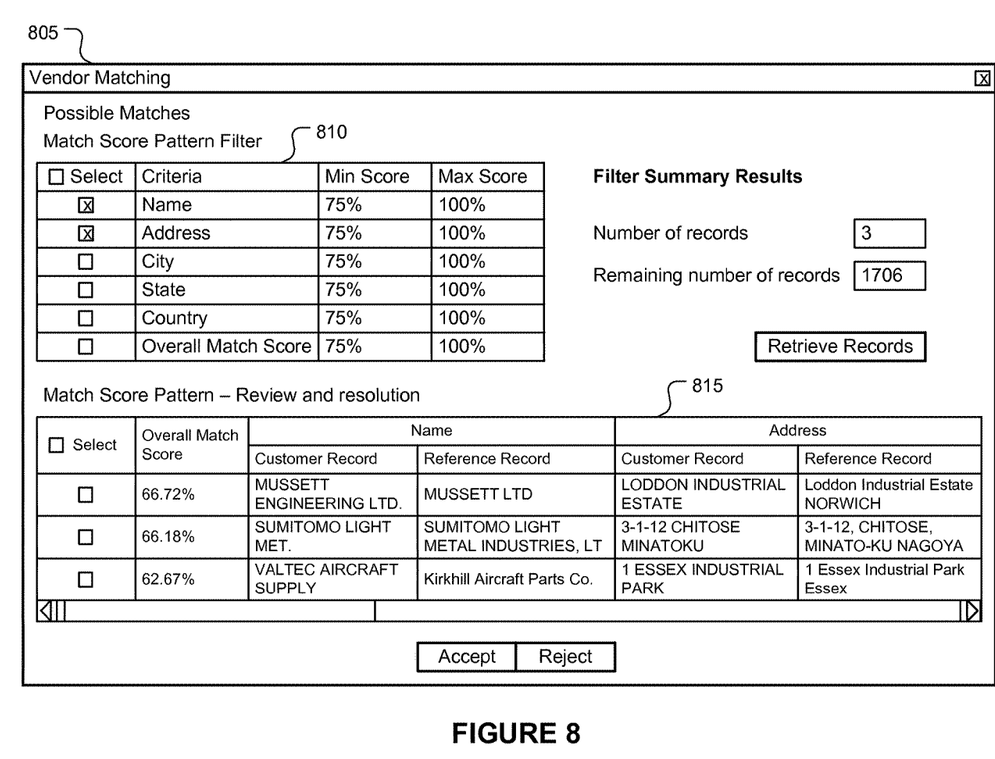

FIGS. 6-8 illustrate example interfaces of an adaptive learning machine that displays statistical output from the matching process for review by a resolution expert. FIG. 6 illustrates an example interface 605 that displays the number of data records in each category. For example, row 610 indicates that the adaptive learning machine found matches in the database for 1832 data records received from clients. Row 615 indicates that the adaptive learning machine found possible matches in the database for 1728 data records, of which 1709 of those data records are unresolved. Row 620 indicates that the adaptive learning machine did not find matches for 119 data records, all of which are unresolved. The interface 605 allows the resolution expert to explore possible matches by selecting the explore button 625.

FIG. 7 illustrates an example interface 705 that displays the possible matches for review by the resolution expert. A data record received from a client is displayed in column 710, and database records that are possible matches to the data record are displayed in columns 715 and 720. The resolution expert reviews the data record that was received from a client against candidate database records from the database. Metadata, such as a "Match Score" value 725, calculated by the adaptive learning machine is displayed to indicate the amount of similarity between the data record and the database record. The resolution expert selects the matching database records using menu 730 and "Accept" button 735. Alternatively, the resolution expert can accept all or reject all candidate database records.

FIG. 8 illustrates an example interface 805 that displays filtering criteria 810 that can be applied to sets of records. As shown in FIG. 8, the resolution expert has chosen to filter the records on match score thresholds that apply to "Name" and "Address" fields of the records. The candidate database records that satisfy the filtering criteria are displayed in a bottom panel 815. The resolution expert can review the candidate database records displayed in the bottom panel 815 and accept or reject candidate database records in bulk.

A number of implementations have been described. Nevertheless, it will be understood that various modifications may be made. For example, other methods described herein besides or in addition to that illustrated in FIG. 2 may be performed. Further, the illustrated steps of method 200 may be performed in different orders, either concurrently or serially. Further, steps may be performed in addition to those illustrated in method 200, and some steps illustrated in method 200 may be omitted without deviating from the present disclosure. Accordingly, other implementations are within the scope of the following claims.

What is claimed is:

1. A method performed with a distributed computing system for retrieving information, the method comprising:
receiving, at a local computing system, a plurality of data records from one or more remote computing systems, each data record comprising one or more data fields associated with a business enterprise, the one or more data fields comprising a name of the business enterprise;
updating a plurality of database records associated with the received plurality of data records stored in a database communicably coupled to the local computing system, each database record including attributes comprising the name of the business enterprise and an alias associated with the name of the business enterprise, where updating comprises:
searching the database for a database record of the plurality of database records that comprises an attribute that matches the name of the business enterprise or the alias associated with the name of the business enterprise; and
based on the match of the name of the business enterprise or the alias associated with the name of the business enterprise, creating a new database record that includes attributes that comprise the one of the matched name of the business enterprise or the alias associated with the name of the business enterprise, and the other of the name of the business enterprise or the alias associated with the name of the business enterprise;
receiving, at the local computing system, a query from a first user for a particular database record of the plurality of database records, the query comprising at least one of the name of the business enterprise or the alias associated with the name of the business enterprise;
determining, using a matching process, one or more of the plurality of database records based on at least one of the name of the business enterprise or the alias associated with the name of the business enterprise;
displaying, the one or more of the plurality of database records;
after displaying the one or more of the plurality of database records in response to the query, displaying, to a second user that is different than the first user, a statistical output of the matching process for a matching process review, the statistical output for the matching process review comprising a first number of records for which successful matches were found by the matching process, a second number of records for which no matches were found by the matching process, a third number of records for which possible matches were found by the matching process, and a user interface object for reviewing the possible matches and updating the matching process based on the possible matches;
in response to a selection by the second user of the user interface object, displaying a possible match view for a data record to be reviewed, wherein the possible match view includes a plurality of attributes of the data record to be reviewed, a plurality of database records associated with the data record to be reviewed, and a matching score for each of the plurality of database records calculated based on the matching process, the matching score indicating an amount of similarity between the data record to be reviewed and the respective database record; and
receiving a selection by the second user for each of the plurality of database records, wherein the selection indicates whether the respective database record is accepted or rejected for the matching process.

2. The method of claim 1, wherein the alias comprises at least one of a phonetic spelling of the name of the business enterprise, one or more initials of the name of the business enterprise, or an anagram of the name of the business enterprise.

3. The method of claim 2, wherein the attributes comprise a plurality of aliases, and the plurality of aliases comprise a first alias associated with the phonetic spelling of the name of the business enterprise, a second alias associated with the initials of the name of the business enterprise, and a third alias associated with the anagram of the name of the business enterprise.

4. The method of claim 1, wherein the matching process further comprising:
comparing at least one of the name of the business enterprise or the alias associated with the name of the business enterprise with the attributes of the plurality of database records;
matching the query with at least one of the plurality of database records based on the comparison; and
preparing the at least one matched database record for display at a remote computing system that sent the query.

5. The method of claim 4, wherein matching the query with at least one of the plurality of database records based on the comparison comprises at least one of:
matching at least one of (i) the name of the business enterprise with the attribute comprising the name of the business enterprise of the database record, or (ii) the alias associated with the name of the business enterprise with the attribute comprising the alias associated with the name of the business enterprise of the database record; or
matching geolocation data in the query with an attribute comprising geolocation data of the business enterprise.

6. The method of claim 4, wherein the at least one matched database record comprises a plurality of matched database records, the method further comprising:
ranking the plurality of matched database records;
transmitting at least a portion of the ranked database records to the remote computing system for display; and
receiving a selection at the local computing system of one of the ranked database records.

7. The method of claim 6, further comprising:
determining whether the selected database record is the highest ranked database record; and
based on the selected database record being lower than the highest ranked database record, increasing a rank of the selected database record.

8. The method of claim 1, wherein the local computing system comprises an adaptive learning machine, and updating a plurality of database records associated with the received plurality of data records stored in a database communicably coupled to the local computing system comprises updating, with the adaptive learning machine, a plurality of database records associated with the received plurality of data records stored in a database communicably coupled to the local computing system.

9. A non-transitory computer storage medium encoded with a computer program, the program comprising instructions that when executed by one or more computers cause the one or more computers to perform operations comprising:
receiving, at a local computing system, a plurality of data records from one or more remote computing systems, each data record comprising one or more data fields associated with a business enterprise, the one or more data fields comprising a name of the business enterprise;
updating a plurality of database records associated with the received plurality of data records stored in a database communicably coupled to the local computing system, each database record including attributes comprising the name of the business enterprise and an alias associated with the name of the business enterprise, where updating comprises:
searching the database for a database record of the plurality of database records that comprises an attribute that matches the name of the business enterprise or the alias associated with the name of the business enterprise; and
based on the match of the name of the business enterprise or the alias associated with the name of the business enterprise, creating a new database record that includes attributes that comprise the one of the matched name of the business enterprise or the alias associated with the name of the business enterprise, and the other of the name of the business enterprise or the alias associated with the name of the business enterprise;
receiving, at the local computing system, a query from a first user for a particular database record of the plurality of database records, the query comprising at least one of the name of the business enterprise or the alias associated with the name of the business enterprise;
determining, using a matching process, one or more of the plurality of database records based on at least one of the name of the business enterprise or the alias associated with the name of the business enterprise;
displaying, the one or more of the plurality of database records;
after displaying the one or more of the plurality of database records in response to the query, displaying, to a second user that is different than the first user, a statistical output of the matching process for a matching process review, the statistical output for the matching process review comprising a first number of records for which successful matches were found by the matching process, a second number of records for which no matches were found by the matching process, a third number of records for which possible matches were found by the matching process, and a user interface object for reviewing the possible matches and updating the matching process based on the possible matches;
in response to a selection by the second user of the user interface object, displaying a possible match view for a data record to be reviewed, wherein the possible match view includes a plurality of attributes of the data record to be reviewed, a plurality of database records associated with the data record to be reviewed, and a matching score for each of the plurality of database records calculated based on the matching process, the matching score indicating an amount of similarity between the data record to be reviewed and the respective database record; and
receiving a selection by the second user for each of the plurality of database records, wherein the selection indicates whether the respective database record is accepted or rejected for the matching process.

10. The non-transitory computer storage medium of claim 9, wherein the alias comprises at least one of a phonetic spelling of the name of the business enterprise, one or more initials of the name of the business enterprise, or an anagram of the name of the business enterprise.

11. The non-transitory computer storage medium of claim 10, wherein the attributes comprise a plurality of aliases, and the plurality of aliases comprise a first alias associated with the phonetic spelling of the name of the business enterprise, a second alias associated with the initials of the name of the business enterprise, and a third alias associated with the anagram of the name of the business enterprise.

12. The non-transitory computer storage medium of claim 9, wherein the matching process further comprises:
comparing at least one of the name of the business enterprise or the alias associated with the name of the business enterprise with the attributes of the plurality of database records;
matching the query with at least one of the plurality of database records based on the comparison; and
preparing the at least one matched database record for display at a remote computing system that sent the query.

13. The non-transitory computer storage medium of claim 12, wherein matching the query with at least one of the plurality of database records based on the comparison comprises at least one of:
matching at least one of (i) the name of the business enterprise with the attribute comprising the name of the business enterprise of the database record, or (ii) the alias associated with the name of the business enterprise with the attribute comprising the alias associated with the name of the business enterprise of the database record; or
matching geolocation data in the query with an attribute comprising geolocation data of the business enterprise.

14. The non-transitory computer storage medium of claim 12, wherein the at least one matched database record comprises a plurality of matched database records, and the operations further comprise:
    ranking the plurality of matched database records;
    transmitting at least a portion of the ranked database records to the remote computing system for display;
    receiving a selection at the local computing system of one of the ranked database records;
    determining whether the selected database record is the highest ranked database record; and
    based on the selected database record being lower than the highest ranked database record, increasing a rank of the selected database record.

15. A system of one or more computers configured to perform operations comprising:
    receiving, at a local computing system, a plurality of data records from one or more remote computing systems, each data record comprising one or more data fields associated with a business enterprise, the one or more data fields comprising a name of the business enterprise;
    updating a plurality of database records associated with the received plurality of data records stored in a database communicably coupled to the local computing system, each database record including attributes comprising the name of the business enterprise and an alias associated with the name of the business enterprise, where updating comprises:
        searching the database for a database record of the plurality of database records that comprises an attribute that matches the name of the business enterprise or the alias associated with the name of the business enterprise; and
        based on the match of the name of the business enterprise or the alias associated with the name of the business enterprise, creating a new database record that includes attributes that comprise the one of the matched name of the business enterprise or the alias associated with the name of the business enterprise, and the other of the name of the business enterprise or the alias associated with the name of the business enterprise;
    receiving, at the local computing system, a query from a first user for a particular database record of the plurality of database records, the query comprising at least one of the name of the business enterprise or the alias associated with the name of the business enterprise;
    determining, using a matching process, one or more of the plurality of database records based on at least one of the name of the business enterprise or the alias associated with the name of the business enterprise;
    displaying, the one or more of the plurality of database records;
    after displaying the one or more of the plurality of database records in response to the query, displaying, to a second user that is different than the first user, a statistical output of the matching process for a matching process review, the statistical output for the matching process review comprising a first number of records for which successful matches were found by the matching process, a second number of records for which no matches were found by the matching process, a third number of records for which possible matches were found by the matching process, and a user interface object for reviewing the possible matches and updating the matching process based on the possible matches;
    in response to a selection by the second user of the user interface object, displaying a possible match view for a data record to be reviewed, wherein the possible match view includes a plurality of attributes of the data record to be reviewed, a plurality of database records associated with the data record to be reviewed, and a matching score for each of the plurality of database records calculated based on the matching process, the matching score indicating an amount of similarity between the data record to be reviewed and the respective database record; and
    receiving a selection by the second user for each of the plurality of database records, wherein the selection indicates whether the respective database record is accepted or rejected for the matching process.

16. The system of claim 15, wherein the alias comprises at least one of a phonetic spelling of the name of the business enterprise, one or more initials of the name of the business enterprise, or an anagram of the name of the business enterprise.

17. The system of claim 16, wherein the attributes comprise a plurality of aliases, and the plurality of aliases comprise a first alias associated with the phonetic spelling of the name of the business enterprise, a second alias associated with the initials of the name of the business enterprise, and a third alias associated with the anagram of the name of the business enterprise.

18. The system of claim 15, wherein the matching process further comprises:
    comparing at least one of the name of the business enterprise or the alias associated with the name of the business enterprise with the attributes of the plurality of database records;
    matching the query with at least one of the plurality of database records based on the comparison; and
    preparing the at least one matched database record for display at a remote computing system that sent the query.

19. The system of claim 18, wherein matching the query with at least one of the plurality of database records based on the comparison comprises at least one of:
    matching at least one of (i) the name of the business enterprise with the attribute comprising the name of the business enterprise of the database record, or (ii) the alias associated with the name of the business enterprise with the attribute comprising the alias associated with the name of the business enterprise of the database record; or
    matching geolocation data in the query with an attribute comprising geolocation data of the business enterprise.

20. The system of claim 18, wherein the at least one matched database record comprises a plurality of matched database records, and the operations further comprise:
    ranking the plurality of matched database records;
    transmitting at least a portion of the ranked database records to the remote computing system for display;
    receiving a selection at the local computing system of one of the ranked database records;
    determining whether the selected database record is the highest ranked database record; and
    based on the selected database record being lower than the highest ranked database record, increasing a rank of the selected database record.

* * * * *